United States Patent Office 3,238,250
Patented Mar. 1, 1966

---

3,238,250
SELECTIVE OXIDATION OF OZONOLYSIS INTERCONDENSATION PRODUCTS TO CARBOXYLIC ACIDS WITH OZONE CATALYZED OXYGEN IN THE PRESENCE OF AT LEAST TWO MOLS OF FORMIC ACID PER MOL EQUIVALENT OF PEROXIDE GROUPS
Philip S. Bailey, Austin, Tex., assignor, by mesne assignments, to Esso Research and Engineering Company, Elizabeth, N.J., a corporation of Delaware
No Drawing. Filed Mar. 31, 1961, Ser. No. 99,705
23 Claims. (Cl. 260—514)

This application is a continuation-in-part of Serial No. 792,965, now abandoned, entitled, "Process for the Preparation of Polycarboxylic Acids," and Serial No. 792,966, now abandoned, entitled, "Process for the Preparation of Carboxylic Acids," both filed February 13, 1959, for P. S. Bailey and which are continuations-in-part of P. S. Bailey application Serial No. 658,493, entitled, "Process for the Preparation of Alpha,Omega-Dicarboxylic Acids," filed May 13, 1957, now abandoned.

This invention is directed to a process for the preparation of carboxylic acids. More particularly, this invention is directed to a process for the preparation of carboxylic acids of high purity in good yield from olefins.

An object of the present invention is the provision of a process for the preparation of carboxylic acids.

Another object of the present invention is the provision of a combination ozonolysis-oxidation process for the preparation of carboxylic acids from olefins.

These and other objects are attained by ozonolysis of an olefin in solution in a reactive ozonolysis solvent (as hereinafter defined) at a temperature within the range of about 30° to —100° C. to form a peroxidic ozonolysis intercondensation product of the olefin with ozone and the solvent, followed by oxidation of the said peroxidic intercondensation product in a formic acid-containing solution (as hereinafter defined) with molecular oxygen in the presence of catalytic amounts of ozone, whereby the desired carboxlyic acid is substantially selectively provided.

Ozonolysis of an olefin of the type containing at least 1 hydrogen atom on the carbon atoms linked by the olefin double bond in solution in a reactive solvent will result in the formation of a peroxidic intercondensation product involving the reaction of 1 mol equivalent of ozone and from about 1 to 3 mol equivalents of solvent with each olefinic bond in the molecule. Conversion of the peroxidic intercondensation product to a carboxylic acid product presents a serious problem when it is desired to conduct the conversion by oxidation with molecular oxygen. Thus, the peroxidic intercondensation product will contain functional groups (as hereinafter more fully explained in detail) other than peroxide groups such as aldehyde groups or hydroxyl groups. As a consequence, there is a tendency for such additional functional groups to become involved in side reactions which lead to the formation of intractable oxidation products contaminated with by-products other than carboxylic acids. Moreover, such by-products are generally separated from the desired carboxylic acid product only with difficulty.

It has been discovered in accordance with the present invention, however, that molecular oxygen may be successfully used with a substantially selective conversion of the peroxidic intercondensation product to carboxylic acids by conducting the oxidation in a particular manner. Thus, in accordance with the present invention the peroxidic intercondensation product is dissolved in a solvent consisting of formic acid or a mixture of formic acid with acetic acid, such solvent containing at least 2 mol equivalents of formic acid per mol equivalent of peroxide group in the peroxidic intercondensation product. Thereafter, molecular oxygen which contains a catalytic amount of ozone is passed through the solution at a temperature from about 20° C. to about reflux temperatures preferably intermediate about 50° C. and reflux temperature until substantially all of the peroxide groups have disappeared. Temperatures may range from about 20° to about 70° C. with particular peroxidic intercondensation products. As a consequence, the peroxidic intercondensation product is substantially selectively converted to a desired carboxylic acid product. If formic acid is not utilized as a solvent or if catalytic amounts of ozone are not present during the oxidation, the desired selectivity is not obtained.

The starting olefinic material for the present invention may be defined as an olefin containing at least 1 hydrogen atom attached to the carbon atoms linked by the olefinic double bond. Representative olefins of this nature include straight chain and branched chain monoolefins and polyolefins, monocyclic and polycyclic monoolefins and polyolefins. In general, the feed materials should be an olefin which is at least partially soluble in the solvent under reaction conditions, such as an at least partially soluble olefin containing 4 to 20 carbon atoms in the molecule. Representative open chain olefins that may be utilized include materials such as butene-1, butene-2, 1,5-hexadiene, pentene-1, straight and branched chain heptenes, octenes, decene-1, dodecene-1, etc. Representative cyclic olefins that may be utilized include monocyclic olefins such as cyclopentent, 3-methylcyclohexene-1, 4-methylcyclohexene-1, 2,3,3-trimethylcyclopentene, 1-n-butylcyclopentene, cyclohexene, cycloheptene, 2,4-dimethyl cyclohexene-1, 3,5-dimethyl cyclohexene-1, 4-methyl-2-ethyl cyclohexene-1, 4-methyl-2-n-propyl-cyclohexene-1, 4-methyl-2-n-butyl cyclohexene-1, 3-methylcycloheptene-1, 4-methylcycloheptene-1, 2,4-dimethylcycloheptene - 1, 3,5 - dimethylcycloheptene - 1, cyclooctene, cyclohexadiene, etc., 4-vinylcyclohexene, norbornylene, 6-methylbicyclo(2.2.1)-2-heptene, 1,5-cyclooctadiene, 1,5,9-cyclododecatriene, and the like. The dicyclic diolefins of the norbornylene type may be prepared by the Diels-Alder reaction of the cyclic diolefin with an open chain monoolefin (e.g., Joshel and Butz, J. Am. Chem. Soc., vol. 63, page 3350, 1941). The vinyl cyclohexene, cyclooctadiene, and cyclododecatriene may be prepared by the dimerization and trimerization, respectively, of butadiene.

The term, "reactive solvent," may be defined in its accepted sense as a solvent containing a $C_1$ to $C_4$ alkyl alcohol, formic acid, acetic acid, a mixture thereof, or a mixture of one or more such reactive solvents with a cosolvent such as acetone, chloroform, carbon tetrachloride, etc. which is substantially completely unreactive with the zwitterion formed by reaction of the ozone with the olefin under the ozonolysis conditions employed. (See for example, "The Reactions of Ozone with Organic Compounds," P. S. Bailey, Chem. Reviews, vol. 58, 925–1010, 1958.) However, such mixture should contain at least 2 mol equivalents of reactive solvent per mol equivalent of olefin. The ozonolysis reaction is preferably conducted at temperatures within the range of about —100° to about 30° C. by passing a mixture of oxygen with ozone through a solution of the olefin in an excess (e.g., 2 to 20 mols) of the reactive solvent. For example, the mixture of oxygen with ozone may contain from about 2 to 6 weight percent of ozone and the oxygen-ozone mixture may be passed through the solution at a rate within the range of about 0.01 to about 0.5 cubic foot of gaseous mixture per liter of solution per minute. The ozonolysis reaction should, of course, be conducted above the freezing point of the solvent employed.

Under these conditions, the ozone will substantially selectively interreact with the olefin to form a zwitterion which will react with the reactive solvent to provide a peroxidic intercondensation product.

In accordance with one form of the present invention, the solvent for the ozonolysis step consists of formic acid, acetic acid, or a mixture thereof. In this situation, the solvent concentration is adjusted at the end of the ozonolysis step by the addition of formic acid, if necessary, in order to provide a solution for the oxidation of the peroxidic intercondensation product which contains the requisite amount of formic acid. Thereafter, the oxidation step may be conducted in the manner to be described.

When other reactive solvents, such as alcohols, are used it is necessary to recover the peroxidic intercondensation product at the end of the ozonolysis reaction. This may be accomplished in any desired manner such as, for example, by evaporation of excess solvent. Some of the peroxidic intercondensation products, such as those derived from straight chain olefins, tend to be unstable and prone to spontaneous decomposition. With materials of this nature, due care should be utilized in the recovery step. For example, the peroxidic intercondensation product should be isolated at a temperature of less than about 0° C. On the other hand, many of the peroxidic intercondensation products such as those derived from cyclic monoolefins are generally stable at room temperature or lower whereby higher recovery temperatures may be utilized.

The peroxidic intercondensation product may be monomeric or polymeric and will normally be comprised of a mixture of peroxidic intermediates. Thus, intermediates having the following generalized formulas may be present as components of the peroxidic intercondensation product:

(I) $$R-\overset{O}{\underset{}{C}}H$$

(II) $$R-\underset{R'}{\overset{H}{C}}-OOH$$

(III) $$R-\underset{R'}{\overset{OH}{C}}H$$

(IV) $$R-\underset{R'}{\overset{R'}{C}}H$$

(V) 

(VI) 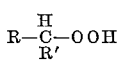

(VII) 

(VIII) 

(IX) 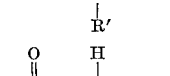

(X) 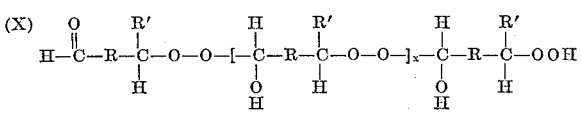

(XI) 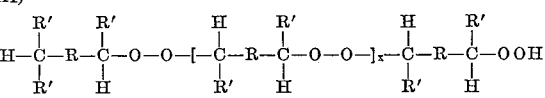

wherein R' represents a group derived from the reactive solvent which is alkoxy when the reactive solvent is an alcohol and which is acetoxy or formoxy when the reactive solvent is acetic acid or formic acid, respectively;

wherein R represents the group corresponding to the parent olefinic starting material; and wherein X is an integer which is 1 or 2 or more.

It will be understood that in the above formulas R may represent groups derived from 1 or a plurality of olefinic feed materials, depending upon whether or not the ozonolysis is conducted with a single olefinic starting material or a mixture of 2 or more olefinic starting materials.

In accordance with the present invention, a peroxidic intercondensation product as above described or a mixture or 2 or more such products is oxidized with molecular oxygen in a particular manner. Thus, the peroxidic intercondensation product is first dissolved in an excess of formic acid (e.g., 2 to 20 mol equivalents, base upon the peroxide content of the peroxidic intercondensation product). If desired, acetic acid may be substituted for a portion of the formic acid; provided, however, that at least about 2 mols of formic acid per mol of peroxide group are present in the resultant mixture.

The oxidation reaction is thereafter initiated by passing a mixture of molecular oxygen with a catalytically effective amount of ozone through the formic acid solution. For example, the mixture of molecular oxygen and ozone should contain from about 0.01 to about 1 percent of ozone. The oxidation reaction is conducted at a temperature intermediate about 50° C. and reflux temperature. Preferably, the oxidation reaction is conducted at reflux temperature. It is also preferable to conduct the oxidation reaction at atmospheric pressure for reasons of economy and therefore the atmospheric pressure reflux temperature of the solution will normally determine the upper temperature limit for the oxidation reaction. However, superatomspheric pressures may be employed if it is desired to raise the reflux temperature above atmospheric pressure reflux temperature.

Care should be taken in the case of cyclohexenes and cycloheptenes to selectively oxidize aldehyde groups present in the peroxidic intercondensation product at a temperature of less than about 70° C. until oxidation of the aldehyde groups is substantially complete and in order to prevent aldol type reactions leading to the formation of undesired by-products before raising the temperature of the solution to reflux temperature. Thus, for example, the reaction mixture may be maintained at a temperature within the range of about 20° to 70° C. for a period of time within the range of about 0.5 to 10 hours (preferably 1 to 4 hours) sufficient to permit substantially complete selective oxidation of the aldehyde groups to carboxyl groups.

The oxidation reaction for the cyclic olefins peroxidic intercondensation product is thus initiated at a temperature of less than about 70° C. by passing molecular oxygen having contained therein a catalytically effective amount of ozone (e.g., from about 0.01 to about 1 percent of ozone, based on the molecular oxygen) through the solution of peroxidic intermediate.

The flow rate of the ozone containing molecular oxygen through the reaction mixture may be varied within comparatively wide limits. Preferably, however, the mixture is passed through the solution at a rate which is within the range of about 0.01 to about 0.5 cubic foot of mixture per liter per minute. The oxidation reaction is continued under such conditions by flowing the mixture of oxygen with a catalytic amount of ozone through the solution until substantially all of the peroxide groups have disappeared. This may be readily determined and practiced by testing the reaction product with potassium iodide. When the potassium iodide test gives a negative result, the reaction is substantially complete.

The carboxylic acid may be recovered from the reaction mixture by any suitable means such as filtration, decantation, solvent evaporation, etc.

The carboxylic acid products of the present invention are useful for a wide variety of purposes such as, for example, solvents, raw materials for the preparation of polyamines, polyesters, urethanes, etc. They may also be used as intermediates in the preparation of lubricants, vinyl polymer plasticizers, etc.

The process of the present invention will be further illustrated by the following specific examples which are given by way of illustration and not by way of limitation on the scope of this invention.

*Example I*

Dissolve about 4.1 grams (about 0.05 mol) of cyclohexene in about 50 ml. of anhydrous methanol and cool the resultant solution to a temperature of about −70° C.

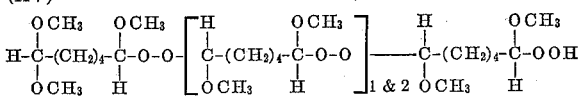

(XV)

The structure of the above-identified products has been verified by infrared analysis, the infrared analysis showing the presence of carbonyl groups and hydroxy groups. The product releases oxygen when treated with lead tetraacetate, thus definitely establishing the presence of hydroperoxides. Analysis of the product showed about 50.7 percent of carbon, about 9.15 weight percent of hydrogen, and about 26.30 weight percent methoxy.

The predominant products, when the methanol is removed from the reaction product as soon as possible after ozonolysis, are the hemiperacetal polymers. This reaction product is mildly reactive with methanol as is shown by a change in product composition, favoring the formation of the peracetal polymers when the methanol solution of reaction product is permitted to stand. This is shown by the results obtained by analysis of the reaction product from immediate evaporation, from evaporation at the end of one hour, and from evaporation at the end of 4 days, as shown by the following table.

TABLE I.—ANALYTICAL DATA FOR PEROXIDIC PRODUCTS

| | Syrup from Immed. Evap. | Syrup from Evap. after 1 Hr. | Syrup from Evap. after 4 Days | Theor. for Structure XIV | Theor. for Srructure XV | Theor. for Structure XIII |
|---|---|---|---|---|---|---|
| Percent C | 50.67, 50.42 | 50.88, 50.74 | 51.94, 51.74 | 51.84 | 53.55 | 51.90 |
| Percent H | 9.15, 9.07 | 8.98, 9.09 | 9.14, 9.26 | 8.70 | 9.35 | 9.68 |
| Percent O | | 38.0, 37.4 | | 39.46 | 37.10 | 38.42 |
| Percent Active O | | 7.44, 7.31 | | 9.86 | 8.56 | 7.68 |
| Percent OCH$_3$ | 26.30, 25.95 | 36.21, 36.02 | 41.51, 40.92 | 19.14 | 38.75 | 44.71 |
| Av. Mol. Wt. | | 402, 584 | 393 | 484 | 561 | 208 |
| Infrared Spectrum | Strong OH bond at 2.95μ; medium >C=O bond at 5.8μ. | Strong OH bond at 3μ weak >C=O bond at 5.75μ. | Strong OH bond at 3μ; weak >C=O bond at 5.75μ. | | | |

Pass dried oxygen through an ozonator under conditions to form a gaseous mixture of ozone tnd oxygen containing about 2 to 6 percent by weight of ozone and pass the resultant mixture through the methanol solution at the rate of about 20 liters of gas per hour. Continue the passage of the ozone-oxygen mixture until about 1 mol of ozone per mol of cyclohexene has been absorbed. This may readily be determined by testing the tail gas from the reaction zone. When the tail gas gives a strong test for the presence of ozone the reaction is substantially complete.

After about 1 mol of ozone per mol of cyclohexene has been absorbed, evaporate the methanol from the reaction product at room temperature at a pressure of about 0.5 ml. A clear viscous syrup is obtained with substantially quantitative yield. The syrup consists essentially of a mixture of a monomeric ω-aldehydemethoxyhydroperoxide, the acetal of said substance and hemiperacetal and peracetal trimers and tetramers of these substances as shown by the following formulas:

(XII) 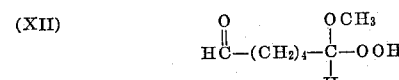

(XIII) 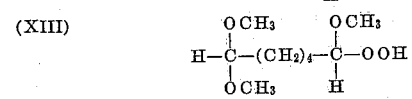

(XIV) 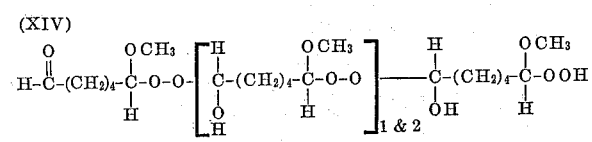

*Example II*

In order to prepare adipic acid, dissolve the reaction product of Example I in about 55 ml. of 80% formic acid (the remainder being water) at room temperature, pass a mixture of about 0.9 weight percent of ozone in oxygen through the formic acid solution at the rate of about 20 liters per hour, allowing the temperature to rise quickly to a temperature of about 35° C. and then cautiously raise the temperature to about 70° C. over a period of about 1.5 hours. Spontaneous reaction of the aldehyde groups with oxygen occurs during this period. About 0.15 mol of ozone per mol of methoxy hydroperoxide is absorbed during this period. Next pass a charge stream consisting of oxygen and a trace amount of ozone through the solution while raising the temperature of the solution to reflux temperature over about a 15 minute period and maintain the refluxing solution at this temperature for about 30 minutes. Cool the resultant product to about 0° C. in an ice water bath to precipitate the adipic acid reaction product and recover the adipic acid by filtration. Additional adipic acid may be recovered by evaporating the filtrate and recrystallizing the residue from a minimal amount of water. The product is substantially pure adipic acid (M.P. 143°–148° C.), the yield of adipic acid based on the cyclohexene starting material being about 73%.

*Example III*

Dissolve a cyclohexene reaction product obtained in the manner set forth in Example I in about 50 ml. of 90% formic acid, immediately heat to reflux temperature and reflux the resultant solution for about 1 hour while passing a mixture of oxygen and a trace amount of ozone through the refluxing solution. A dark brown reaction mixture is obtained which gives a very weak peroxide test with sodium iodide. Evaporate the resultant dark brown residue and treat the residue with ether. On filtration there is obtained about 1.1 gram of a very impure adipic acid product (M.P. 133°–142° C.). This corresponds to a yield of about 15%, based on the cyclohexene starting material. The remainder of the reaction product is a tar.

*Example IV*

Dissolve a cyclohexene reaction product obtained in the manner of Example I in about 55 ml. of 80% formic acid and pass substantially pure oxygen through the resultant solution at the rate of about 20 liters per hour. While passing oxygen through the formic acid solution, quickly raise the temperature from room temperature to 35°, then slowly raise the temperature to 70° C. over a 1½ hour period, then raise the temperature to reflux temperature over about a 15 minute period and maintain the solution at reflux for an additional 30 minutes. A yield of about 1.9 gram of adipic acid (M.P. 146°–148° C.) and a yield of about 1.6 gram of impure adipic acid (M.P. 133°–142° C.) is obtained, or a total of about 3.5 grams of impure material. This corresponds to a yield of about 48% based on the cyclohexene starting material.

*Example V*

Repeat Example II with but one exception, namely the substitution of 90% acetic acid for the 80% formic acid. The reaction mixture is strongly peroxidic at the end of the normal reaction period and gives a reaction product substantially identical with the reaction product of Example III in about the same yield.

*Example VI*

Repeat Example V, but in this instance add about 1 ml. of concentrated sulfuric acid to the acetic acid solution. At the end of the reaction period, the reaction mixture gives a moderate peroxide test with sodium iodide. On cooling of the reaction mixture to room temperature, there is obtained about 2.8 grams of adipic acid melting at 144°–148° C. Evaporation of the filtrate and trituration of the residue with ether gives about 3.3 grams of a material melting from about 122° to about 135° C.

*Example VII*

Repeat Example VI but in this instance utilize glacial acetic acid in place of the 90% acetic acid. About 4.4 grams of crystalline fraction are obtained ranging in melting point from about 87° to about 138° C.

*Example VIII*

Repeat Examples I and II in sequence, but in this instance utilize cycloheptene in place of the cyclohexene of Example I. The product of the ozonolysis-oxidation reaction is pimelic acid.

*Example IX*

Repeat Examples I and II in sequence, but in this instance utilize 3-methylcyclohexene as the starting material. The product is 2-methyl adipic acid. In like manner, ozonolysis of 4-methyl-2-ethylcylohexene-1 as described in Example I, followed by oxidation as described in Example II will provide a yield of a keto acid

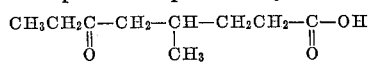

Substitution of 3,5-dimethylcycloheptene-1 for the 4-methyl-2-ethylcyclohexene-1 will provide the corresponding keto acid.

*Example X*

Dissolve about 3 grams of norbornylene in about 60 cc. of anhydrous methanol and cool the resultant solution to a temperature of about −75° C. Pass dried oxygen through an ozonator under conditions to form a gaseous mixture of ozone and oxygen containing about 2 to 6 percent by weight of ozone and pass the resultant mixture through the methanol solution at the rate of about 20 liters of gas per hour. Continue the passage of the ozone-oxygen mixture through the solution until about 1 mol of ozone per mol of norbornylene has been absorbed. This may readily be determined by testing the tail gas from the reaction zone. When the tail gas gives a test for the presence of ozone, the reaction is substantially complete and may be terminated.

After 1 mol of ozone per mol of norbornylene has been absorbed, evaporate excess methanol from the reaction product under a reduced pressure at room temperature. A clear, colorless gum is obtained comprising a mixture of cyclopentane peroxides, including those set forth below.

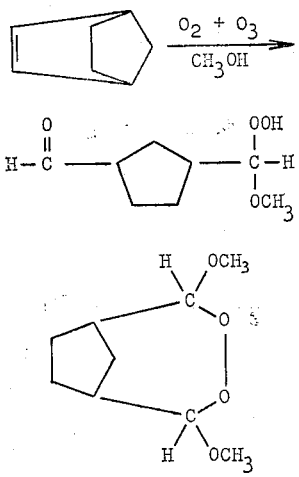

A positive test is obtained with potassium iodide and lead tetraacetate. The product is insoluble in carbon disulfide, carbon tetrachloride, and petroleum ether, is slightly soluble in benzene, in bromoform (with discoloration) and ethanol and is soluble in ethanol, formic acid and dioxane. The product gives a strong test when treated with sodium iodide and when treated by the Fuchsin test. Analysis of the product is as follows:

*Analysis.*—Found: Active oxygen, 7.16, 8.5; C, 54.73, 57.10; H, 8.39, 8.53; $OCH_3$, 33.16, 32.80.

*Example XI*

In order to substantially selectively prepare cis-cyclopentane-1,3-dicarboxylic acid, dissolve the reaction product of Example X in about 55 ml. of 90 percent formic acid (the remainder being water) at room temperature and commence the passage of a mixture of about 0.9 weight percent of ozone with molecular oxygen through the formic acid solution at the rate of about 20 liters per hour. Slowly raise the reaction temperature to reflux temperature over a period of about 1.5 hours and maintain the solution at reflux temperature for an additional period of time to permit the reaction of about 1 mol equivalent of molecular oxygen with the reaction product. This may be readily determined by testing the reaction product with potassium iodide. When the potassium iodide test gives a negative result, the reaction is substantially complete.

Cool the resultant product to about 0° C. in an ice water bath to precipitate the cis-cyclopentane-1,3-dicarboxylic acid and recover the acid by filtration. Additional acid may be recovered by evaporating the filtrate and recrystallizing the residue with a minimal amount of water. The product in each instance is substantially pure cis-cyclopentane-1,3-dicarboxylic acid (M.P. 119°–120° C.). The over-all yield, based on the norbornylene, was 55 percent.

*Example XII*

Repeat Example XI with but one exception. Utilize molecular oxygen free from ozone as the oxidizing agent. During the course of the ensuing oxidation reaction, darkening of the reaction medium occurs and the product that is obtained at the end of the oxidation reaction is a dark orange in color. The yield of the cis-cyclopentane-1,3-dicarboxylic acid is only about 60 percent of that obtained in the case of Example XI.

*Example XIII*

Repeat Example XI with but one exception. Pass the above-described mixture of oxygen and ozone through the formic acid solution for about 1 hour. Thereafter, pass a gas consisting of molecular oxygen through the reaction mixture. Darkening of the reaction mixture again occurs when the gas consists of molecular oxygen and the cis-cyclopentane-1,3-dicarboxylic acid is contaminated with a dark orange oily material.

*Example XIV*

Repeat Example XI with but one change. Use an equivalent amount of 90 percent acetic acid as the solvent instead of 90 percent formic acid. Again, discoloration of the reaction mixture occurs during the oxidation reaction.

*Example XV*

Repeat Example XI with but one exception, namely the use of trifluoroacetic acid as the solvent in place of formic acid. The product that is obtained is a black oil.

*Example XVI*

Repeat Examples X and XI in sequence but in this instance substitute 6-methylbicyclo(2.2.1)-2-heptene for the norbornylene. The product at the end of the oxidation reaction is substantially pure 4-methyl-cis-cyclopentane-1,3-dicarboxylic acid.

*Example XVII*

Dissolve about 1 gram of 1-octene in about 10 cc. of acetic acid. Pass a mixture of molecular oxygen with ozone containing about 3 weight percent ozone through the resultant mixture while maintaining the mixture at a temperature of about 10° C. Terminate the ozonolysis reaction after the absorption of about 1 mol of ozone per mol of octene. Warm the resultant mixture to room temperature and add an excess of formic acid (about 5 cc.). Pass a mixture of ozone with molecular oxygen containing about 0.5 to 1 weight percent of ozones through the resultant solution and heat the solution to reflux temperature. After about 1 mol equivalent of oxygen has been absorbed, terminate the reaction. Substantially pure heptanoic acid is recovered from the reaction mixture by distillation.

Having described my invention, what is claimed is:

1. A method for preparing a carboxylic acid from a peroxidic intercondensation product of an olefin having at least one hydrogen atom attached to the carbon atoms linked by the olefinic double bond, ozone, and a reactive type solvent selected from the group consisting of the $C_1$ to $C_4$ alkyl alcohols, formic acid, acetic acid and mixtures thereof, prepared by ozonolysis of said olefin in solution in said solvent, said method comprising the steps of dissolving said intercondensation product in a solvent selected from the group consisting of formic acid and mixtures of formic acid with acetic acid, flowing a mixture of molecular oxygen with a catalytically effective amount from about 0.01 to about 1% of ozone through said solution at a temperature within the range from about 20° C. and reflux temperature for a period of time within the range of about 0.5 to 10 hours sufficient to permit conversion of the intercondensation product to a corresponding carboxylic acid and thereafter recovering said carboxylic acid, said solvent containing at least 2 mols of formic acid per mol equivalent of peroxide group.

2. A method for preparing a carboxylic acid product from a peroxidic intercondensation of an olefin having at least one hydrogen atom attached to the carbon atoms linked by the olefinic double bond, ozone, and a reactive type solvent selected from the group consisting of the $C_1$ to $C_4$ alkyl alcohols, formic acid, acetic acid and mixtures thereof prepared by ozonolysis of said olefin in solution in said solvent, said method comprising the steps of dissolving said intercondensation product in about 2 to 20 mol equivalents of a solvent selected from the group consisting of formic acid and mixtures of formic acid with acetic acid, flowing a mixture of molecular oxygen with a catalytically effective amount from about 0.01 to about 1% of ozone through said solution at a temperature intermediate about 50° C. and reflux temperature for a period of time within the range of about 0.5 to 10 hours sufficient to permit conversion of the intercondensation product to a corresponding carboxylic acid and thereafter recovering said carboxylic acid, said solvent containing at least 2 mols of formic acid per mol equivalent of peroxide group.

3. A method for preparing a carboxylic acid from a peroxidic ozonolysis intercondensation product of an olefin having at least one hydrogen atoms attached to the carbon atoms linked by the olefinic double bond and containing 4 to 20 carbon atoms in the molecule, ozone and a reactive type solvent selected from the group consisting of $C_1$ to $C_4$ alkyl alcohols, formic acid, acetic acid and mixtures thereof, said intercondensation product having been prepared by ozonolysis of said olefin in solution in said reactive solvent, said method comprising the steps of dissolving said intercondensation product in from about 2 to 20 mol equivalents of a second solvent selected from the group consisting of formic acid and mixtures of formic acid with acetic acid which contain at least 2 mol equivalents of formic acid per mol equivalent of said peroxidic intercondensation product, flowing a mixture of molecular oxygen with a catalytically effective amount of ozone through said solution at a temperature intermediate about 50° C. and reflux temperature for a period of time within the range of about 0.5 to 10 hours sufficient to permit conversion of the intercondensation product to a corresponding carboxylic acid and recovering said carboxylic acid.

4. A method as in claim 3 wherein the olefin is a cyclic olefin.

5. A method as in claim 4 wherein the cyclic olefin is norborylene.

6. A method as in claim 3 wherein the olefin is an open chain olefin.

7. A method as in claim 6 wherein the open chain olefin is 1-octene.

8. A method for preparing a carboxylic acid which comprises the steps of dissolving a $C_4$ to $C_{20}$ olefin having at least one hydrogen atom attached to the carbon atoms linked by the olefinic double bond in a solvent selected from the group consisting of $C_1$ to $C_4$ alkyl alcohols, formic acid, acetic acid and mixtures thereof, passing a mixture of oxygen and ozone containing about 2 to 6 weight percent of ozone through the resultant solution at a temperature within the range of about −100° to about 30° C. under conditions sufficient to permit absorption of about 1 mol of ozone per mol equivalent of olefinic starting material, whereby a peroxidic intercondensation product of the olefin, ozone and reactive solvent is formed, thereafter preparing a solution of said peroxidic intercondensation product in about 2 to 20 mol equivalents of a second solvent selected from the group consisting of formic acid and mixtures of formic acid with acetic acid to provide a second solution, flowing a mixture of molecular oxygen with a catalytically effective amount from about 0.01 to about 1% of ozone through said second solution at a temperature intermediate about 50° C. and reflux temperature for a period of time within the range of about 0.5 to 10 hours sufficient to permit conversion of the peroxidic intercondensation product to said corresponding carboxylic acid and thereafter recovering said carboxylic acid, said second solvent containing at least 2 mols of formic acid per mol equivalent of peroxide groups in said peroxidic intercondensation product.

9. A method for preparing a carboxylic acid which comprises the steps of dissolving a $C_4$ to $C_{20}$ olefin having at least one hydrogen atom attached to the carbon atoms linked by the olefinic double bond in a formic acid solvent, passing a mixture of oxygen and ozone containing about 2 to 6 weight percent of ozone through the resultant solution at a temperature within the range of about $-100°$ to $30°$ C. under conditions sufficient to permit absorption of about 1 mol of ozone per mol equivalent of olefinic starting material, whereby a peroxidic intercondensation product of the olefin, ozone and said solvent is formed, adjusting the formic acid concentration in said solution at the end of said ozonolysis reaction in order to provide at least about 2 mols of formic acid per mol equivalent of peroxide group in said peroxidic intercondensation product, flowing a mixture of molecular oxygen with a catalytically effective amount from about 0.01 to about 1% of ozone through said adjusted solution at a temperature intermediate about $50°$ C. and reflux temperature for a period of time within the range of about 0.5 to 10 hours sufficient to permit conversion of the peroxidic intercondensation product to a corresponding carboxylic acid and thereafter recovering said carboxylic acid.

10. A method for preparing a carboxylic acid from a peroxidic intercondensation product of an olefin having at least one hydrogen atom attached to the carbon atoms linked by the olefinic double bond, ozone and a reactive type solvent selected from the group consisting of the $C_1$ to $C_4$ alkyl alcohols, formic acid, acetic acid and mixtures thereof prepared by ozonolysis of said olefin in solution in said solvent, said method comprising the steps of dissolving said intercondensation product in formic acid, flowing a mixture of molecular oxygen with a catalytically effective amount from about 0.01 to about 1% of ozone through said solution at a temperature intermediate $50°$ C. and reflux temperature for a period of time within the range of about 0.5 to 10 hours sufficient to permit the conversion of the intercondensation product to a corresponding carboxylic acid and thereafter recovering said carboxylic acid, said solvent containing at least 2 mols of formic acid per mol equivalent of peroxide group.

11. A method for preparing a carboxylic acid from an intercondensation product of an olefin having at least one hydrogen atom attached to the carbon atoms linked by the olefinic double bond, ozone and a reactive type solvent selected from the group consisting of the $C_1$ to $C_4$ alkyl alcohols, formic acid, acetic acid and mixture thereof prepared by ozonolysis of said olefin in solution in said solvent, said method comprising the steps of dissolving said intercondensation product in about 2 to 20 mol equivalents of formic acid, flowing a mixture of molecular oxygen with a catalytically effective amount from about 0.01 to about 1% of ozone through said solution at a temperature intermediate about $50°$ C. and reflux temperature for a period of time within the range of about 0.5 to 10 hours sufficient to permit conversion of the intercondensation product to a corresponding carboxylic acid and thereafter recovering said carboxylic acid.

12. A method for preparing a carboxylic acid from an ozonolysis intercondensation product of an olefin having at least one hydrogen atom attached to the carbon atoms linked by the olefinic double bond and containing 4 to 20 carbon atoms in the molecule, ozone and a reactive type solvent selected from the group consisting of $C_1$ to $C_4$ alkyl alcohols, formic acid and acetic acid and mixtures thereof, said intercondensation product having been prepared by ozonolysis of said olefin in solution in said reactive solvent, said method comprising the steps of dissolving said intercondensation product in from about 4 to 20 mol equivalents of formic acid, flowing a mixture of molecular oxygen with a catalytically effective amount from about 0.01 to about 1% of ozone through said solution at a temperature intermediate about $50°$ C. and reflux temperature for a period of time within the range of about 0.5 to 10 hours sufficient to permit conversion of the intercondensation to a corresponding carboxylic acid product and thereafter recovering said carboxylic acid.

13. A method for preparing a carboxylic acid which comprises the steps of dissolving a $C_4$ to $C_{20}$ olefin having at least one hydrogen atom attached to the carbon atoms linked by the olefinic double bond in a $C_1$ to $C_4$ alkyl alcohol to provide a first solution, passing a mixture of oxygen and ozone containing from about 2 to 6 percent of ozone through said first solution under conditions sufficient to permit the absorption of about 1 mol of ozone per mol equivalent of olefin starting material to thereby provide a peroxidic intercondensation product of said olefin, ozone and said alcohol, recovering said peroxidic intercondensation product, dissolving said peroxidic intercondensation product in formic acid, flowing a mixture of molecular oxygen with a catalytically effective amount from about 0.01 to about 1% of ozone through said formic acid solution at a temperature intermediate about $50°$ C. and reflux temperature for a period of time within the range of about 0.5 to 10 hours sufficient to permit conversion of said intercondensation product to said corresponding carboxylic acid and thereafter recovering said carboxylic acid, said formic acid solution containing from about 2 to 20 mol equivalents of formic acid per mol equivalent of intercondensation product.

14. A method as in claim 13 wherein the olefin is a cyclic olefin.

15. A method as in claim 14 wherein the cyclic olefin is norbornylene.

16. A method for preparing a dicarboxylic acid from a peroxidic intercondensation product of a cyclic olefin, ozone, and a reactive type solvent selected from the group consisting of the $C_1$ to $C_4$ alkyl alcohols, formic acid, acetic acid and mixtures thereof prepared by ozonolysis of said olefin in solution in said solvent, said method comprising the steps of dissolving said intercondensation product in an acid solvent selected from the group consisting of formic acid and mixtures of formic acid with acetic acid, flowing a mixture of molecular oxygen with a catalytically effective amount from about 0.01 to about 1% of ozone through said solution at a temperature within the range of about $20°$ to about $70°$ C. for a period of time within the range of about 0.5 to 10 hours, thereafter completing the conversion of said intercondensation product to the corresponding dicarboxylic acid product at a temperature not exceeding the reflux temperature of said solution and thereafter recovering said dicarboxylic acid, said acid solvent containing at least 2 mols of formic acid per mol equivalent of peroxide group, said cyclic olefin being selected from the group consisting of cyclohexene, cycloheptene and $C_1$ to $C_4$ alkyl ring substituted cyclohexenes and cycloheptenes having a hydrogen atom on an olefinic carbon atom of the ring.

17. A method for preparing a dicarboxylic acid from a peroxidic intercondensation product of a cyclic olefin having at least one hydrogen atom attached to the carbon atoms linked by the olefinic double bond, ozone, and a reactive type solvent selected from the group consisting of the $C_1$ to $C_4$ alkyl alcohols, formic acid, acetic acid and mixtures thereof prepared by ozonolysis of said olefin in solution in said solvent, said method comprising the steps of dissolving said intercondensation product in about 4 to 20 mol equivalents of a solvent selected from the group consisting of formic acid and mixtures of formic acid with acetic acid, flowing a mixture of molecular oxygen with a catalytically effective amount from about 0.01 to about 1% of ozone through said solution at a temperature within the range of about $20°$ to $70°$ C. for a period of time within the range of about 0.5 to 10 hours, thereafter completing the conversion of said intercondensation product to the corresponding dicarboxylic acid at a temperature intermediate $70°$ C. and reflux temperature and thereafter recovering said dicarboxylic acid, said solvent containing at least 2 mols of formic acid per mol equivalent of peroxide group, said cyclic olefin being selected from the group consisting of cyclohexene, cycloheptene and $C_1$ to $C_4$ alkyl substituted cyclohexenes and cycloheptenes.

18. A method as in claim 17 wherein the intercondensation product is an intercondensation product of a cyclohexene with ozone and a $C_1$ to $C_4$ primary alkyl alcohol.

19. A method as in claim 17 wherein the intercondensation product is an intercondensation product of cyclohexene with ozone and a $C_1$ to $C_4$ primary alkyl alcohol.

20. A method as in claim 17 wherein the intercondensation product is an intercondensation product of a cycloheptene with ozone and a $C_1$ to $C_4$ primary alkyl alcohol.

21. A method as in claim 17 wherein the intercondensation product is an intercondensation product of cycloheptene with ozone and a $C_1$ to $C_4$ primary alkyl alcohol.

22. A method for preparing a dicarboxylic acid from a cyclic olefin having at least one hydrogen atom attached to the carbon atoms linked by the olefinic double bond selected from the group consisting of cyclohexene, cycloheptene and $C_1$ to $C_4$ alkyl substituted cyclohexenes and cycloheptenes which comprises the steps of dissolving said olefin in a solvent which contains a reactive solvent selected from the group consisting of $C_1$ to $C_4$ primary alkyl alcohols, formic acid, acetic acid and mixtures thereof, ozonizing said olefin in said solution by contacting said solution with a mixture of ozone and oxygen at a temperature within the range of about $-100°$ to about $30°$ C. under conditions sufficient to permit the absorption of about 1 mol of ozone per mol equivalent of olefin, whereby said olefin is substantially selectively converted to a peroxidic intercondensation product of said olefin, ozone and said reactive solvent, initiating oxidation of said intercondensation product at a temperature within the range of about $20°$ to about $70°$ C. in solution in a second solvent for the oxidation reaction with molecular oxygen in the presence of a catalytically effective amount from about 0.01 to about 1% of ozone, maintaining said solution at a temperature of less than about $70°$ C. for a period of time within the range of about 0.5 to 10 hours, continuing to flow oxygen containing a catalytic amount of ozone through said reaction mixture at a temperature intermediate about $70°$ C. and reflux temperature for a period of time sufficient to complete the conversion of said intercondensation product and thereafter recovering a dicarboxylic acid from said oxidation product, said second solvent for said oxidation reaction being selected from the group consisting of formic acid and mixtures of formic acid with acetic acid, said second solvent being employed in an amount sufficient to provide at least about 2 mol equivalents of formic acid per mol equivalent of peroxide group in said intercondensation product.

23. A method for preparing a dicarboxylic acid from a cyclic olefin having at least one hydrogen atom attached to the carbon atoms linked by the olefinic double bond selected from the group consisting of cyclohexene, cycloheptene and $C_1$ to $C_4$ alkyl substituted cyclohexenes and cycloheptenes which comprises the steps of dissolving said olefin in a solvent which contains a reactive solvent selected from the group consisting of formic acid, acetic acid and mixtures thereof, ozonizing said olefin in said solution by contacting said solution with a mixture of ozone and oxygen at a temperature within the range of about $-100°$ to about $30°$ C. under conditions sufficient to permit the absorption of about 1 mol of ozone per mol equivalent of olefin, whereby said olefin is substantially selectively converted to a peroxidic intercondensation product of said olefin, ozone and said reactive solvent, initiating oxidation of said intercondensation product at a temperature within the range of about $20°$ to about $70°$ C. in solution in said solvent for the oxidation reaction with molecular oxygen in the presence of a catalytically effective amount from about 0.01 to about 1% of ozone, maintaining said solution at a temperature of less than about $70°$ C. for a period of time within the range of about 0.5 to 10 hours, continuing to flow oxygen containing said catalytic amount of ozone through said reaction mixture at a temperature intermediate about $70°$ C. and reflux temperature until the conversion of said intercondensation product is completed and thereafter recovering a dicarboxylic acid from said oxidation product, said solvent being employed in an amount sufficient to provide at least about 2 mol equivalents of formic acid per mol equivalent of peroxide group in said intercondensation product at the initiation of oxidation of said intercondensation product.

References Cited by the Examiner

UNITED STATES PATENTS

| | | | |
|---|---|---|---|
| 2,733,270 | 1/1956 | Fisher | 260—610 |
| 2,963,487 | 12/1960 | Perry | 260—514 |
| 3,126,410 | 3/1964 | Temin et al. | 260—514 |

FOREIGN PATENTS

| | | |
|---|---|---|
| 857,208 | 8/1940 | France. |
| 1,133,772 | 4/1957 | France. |

OTHER REFERENCES

Henne et al., "J. Am. Chem. Soc.," vol. 65, pp. 752–754 (1943).

LORRAINE A. WEINBERGER, *Primary Examiner.*

CHARLES B. PARKER, LEON ZITVER, *Examiners.*